United States Patent [19]

Scott et al.

[11] 4,435,807
[45] Mar. 6, 1984

[54] ORCHARD ERROR CORRECTION SYSTEM

[76] Inventors: Edward W. Scott, 1843 Lake St., Glendale, Calif. 91201; Daniel B. Goetschel, 2106 Massachusetts Ave., #3C, Troy, N.Y. 12180

[21] Appl. No.: 343,109

[22] Filed: Jan. 27, 1982

Related U.S. Application Data

[63] Continuation-in-part of Ser. No. 163,322, Jun. 26, 1980, abandoned.

[51] Int. Cl.³ .............................................. G06F 11/10
[52] U.S. Cl. ..................................................... 371/50
[58] Field of Search .................................... 371/50, 49

[56] References Cited

U.S. PATENT DOCUMENTS

| | | | |
|---|---|---|---|
| 3,008,004 | 11/1961 | Young, Jr. | 371/50 |
| 3,387,261 | 6/1968 | Betz | 371/50 |
| 3,439,332 | 4/1969 | Cook | 371/50 |
| 4,044,328 | 8/1977 | Herff | 371/50 |
| 4,201,976 | 5/1980 | Patel | 371/50 |
| 4,205,324 | 5/1980 | Patel | 371/50 |

FOREIGN PATENT DOCUMENTS 1183746 3/1970 United Kingdom ................. 371/50

*Primary Examiner*—Charles E. Atkinson
*Attorney, Agent, or Firm*—Poms, Smith, Lande & Rose

[57] ABSTRACT

An error correcting system involves the addition of parity type correction bits to each word in a series of digital word forming data to be transmitted or processed. When a person is passing an orchard where a field of partially grown trees are planted, you can look directly down the rows of trees perpendicular to the side of the field, and you can also look at an angle 45 degrees forward and down an open path 45 degrees to the rear of your path along the side of the orchard. In the present system, the error correction parity bits are summed over digits representing more then one vector through the words of data information, which are quite similar to the prospect along three different vectors in an orchard, as mentioned above. Following transmission through a data link in which errors may be introduced by the reversal of certain bits, the bits are summed along the same vectors in an error correcting circuit, and a pattern of error correction "flag" bits is associated with each word with the error correction bits representing sums along vectors which did not have the predetermined parity. A first error correction circuit is provided for correcting single errors within the pattern covered by the vectors; and a second multiple error correcting circuit receives the data from the first error correction circuit after the single errors have been corrected both in the data, the associated correction bits, and in the associated error detection bits, and the residual multiple errors are then corrected in this second error detection circuit. Additional levels of error correction can also be provided by increasing the number of vectors encoded and the number of correction circuits.

14 Claims, 22 Drawing Figures

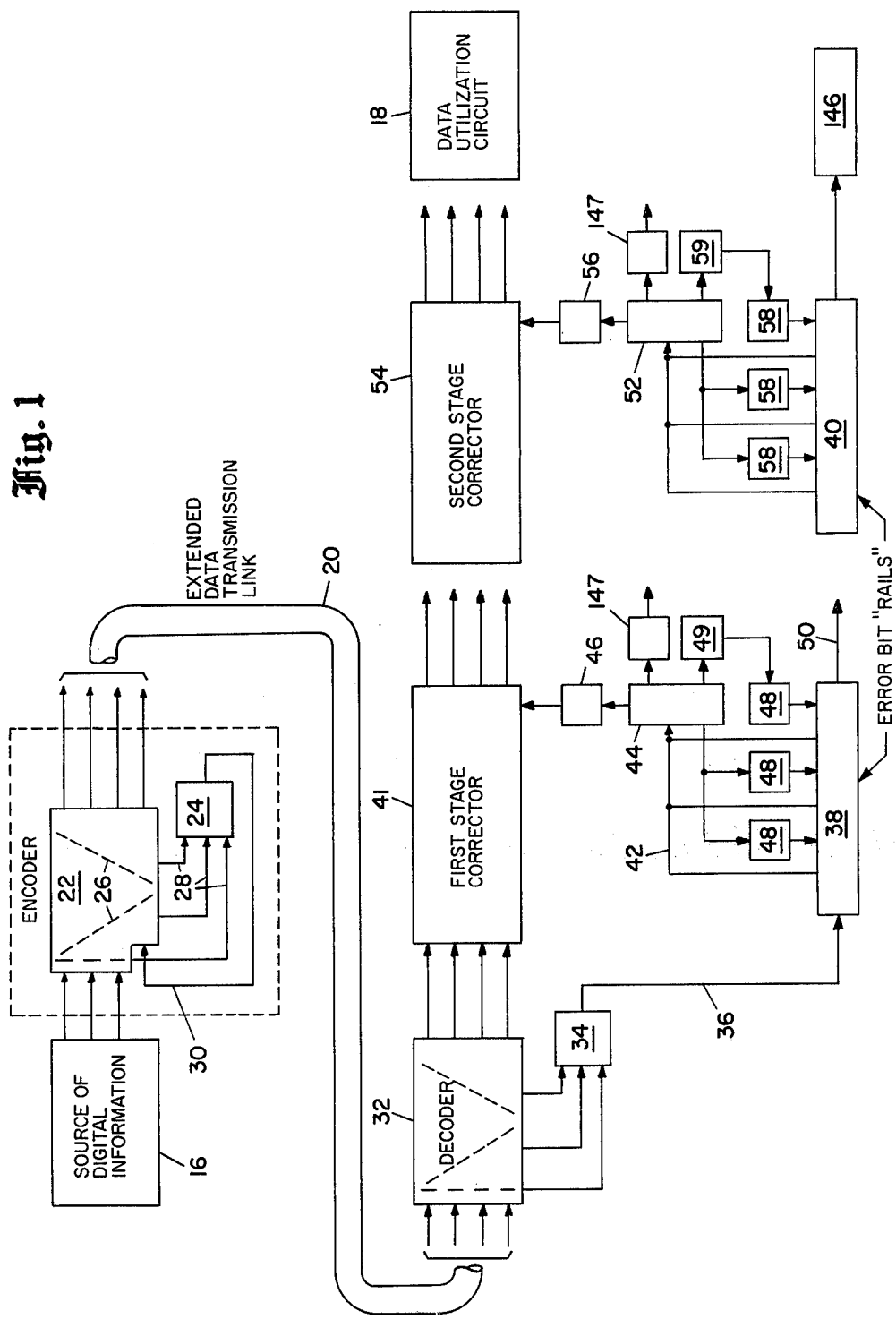

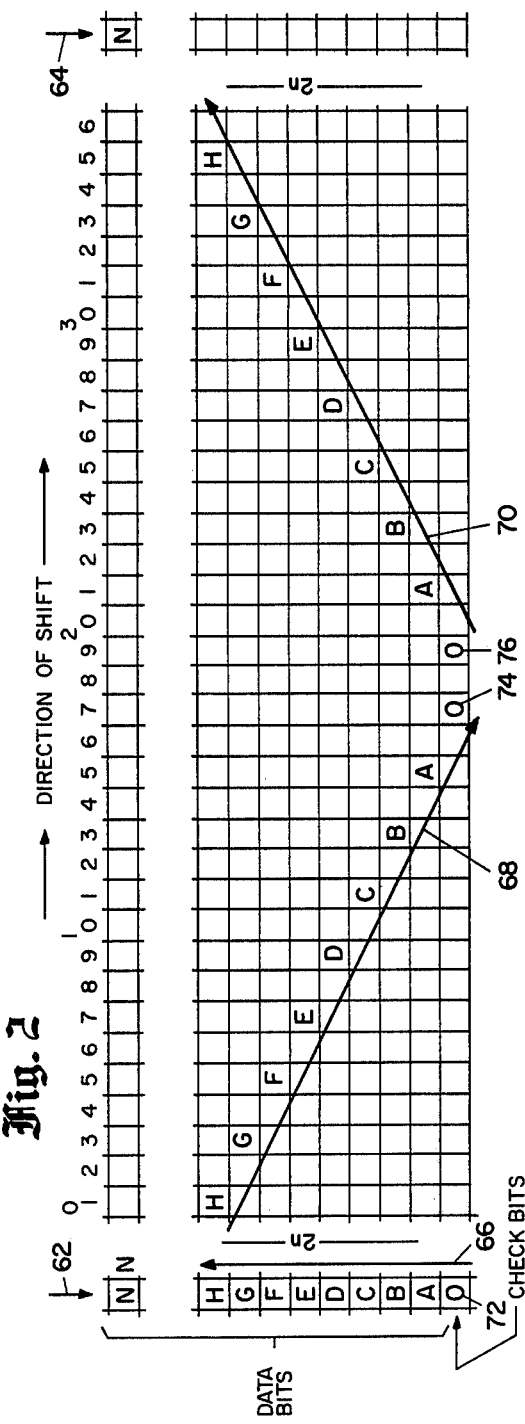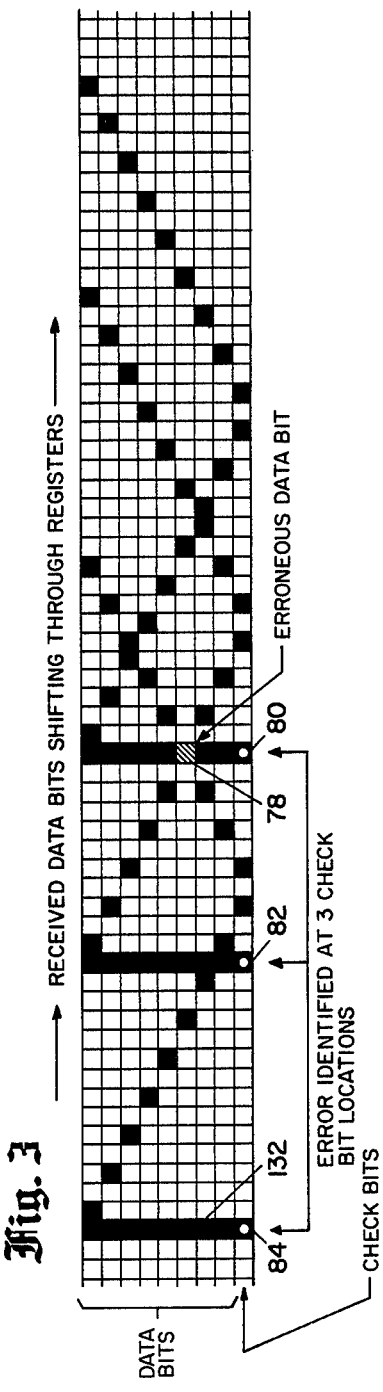

Fig. 5
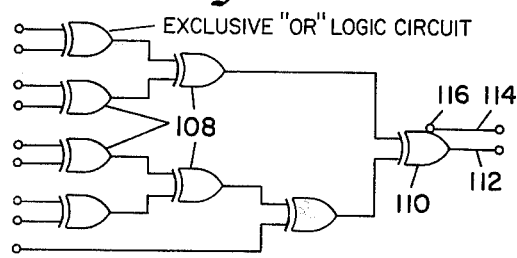
Fig. 6
| ENCODE | DECODE |
|--------|--------|
| Y — W  | U — V  |
|        | W — X  |
|        | Y — Z  |
Fig. 9
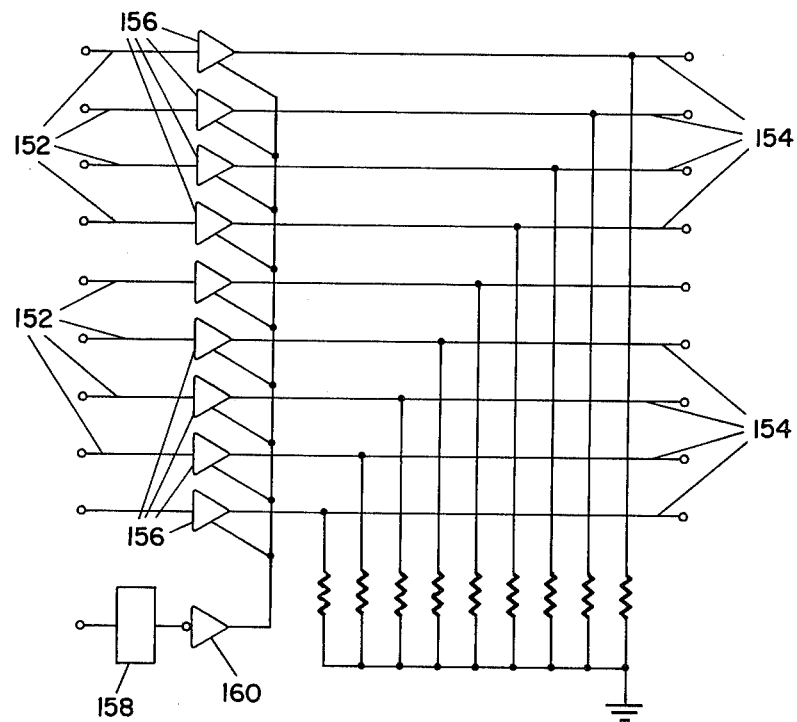

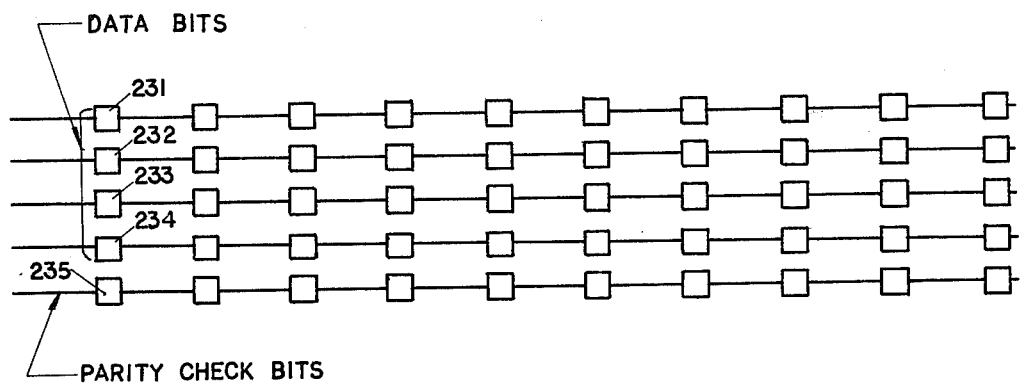
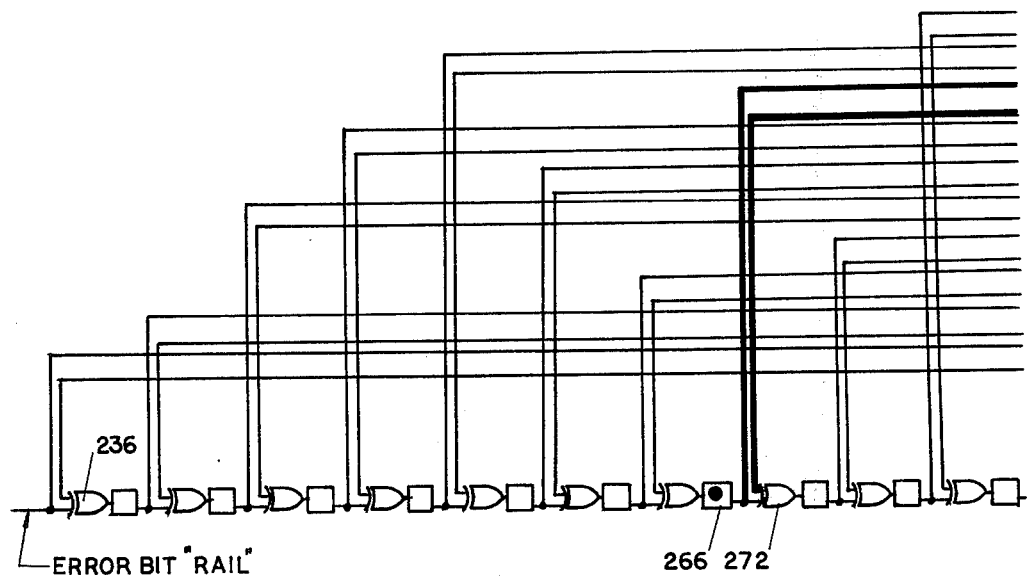
FIG. 17A

ORCHARD ERROR CORRECTION SYSTEM

RELATED CASES

This patent application is a continuation-in-part of our prior U.S. patent application Ser. No. 163,322 filed June 26, 1980, now abandoned.

FIELD OF THE INVENTION

This invention relates to digital error correction circuits.

BACKGROUND OF THE INVENTION

Many error detecting and correcting codes have been proposed heretofore, and there are many patents relating to various error detection and correction systems. Perhaps the simplest error detection system involves the repetition of each digit of a transmitted message, with a lack of identity of two successive digits indicating the presence of an error. Similarly, for error correction, the digit may be repeated three times, and the correct digit determined by a "voting" circuit. Of course, more sophisticated error detection and correction circuits have been proposed, and these have involved what are known as parity check circuits. More specifically, additional error detection or correction bits may be added to groups of digits so that their sum when transmitted is always even, or always odd. Then, at the receiving station, a similar sum may be made, and if there is a change in parity, an error is present.

A moderately sophisticated error correction circuit is disclosed in B. K. Betz, U.S. Pat. No. 3,387,261. In this patent, a system is disclosed for correcting errors through the use of two parity check bits, one taken horizontally through a digital word, and the second taken diagonally through successive digits of adjacent words in a matrix of information. An error in one bit of the information will produce an error in parity in one of the vertical error correction parity bits, and also in one of the diagonal parity bits, and the two error correction bits together will uniquely identify the erroneous information bit, and it can then be corrected.

One problem with the system disclosed in the Betz patent, as well as with many of the other systems which have previously been proposed, is that they characteristically require excessive redundancy relative to their capabilities for correcting data.

Accordingly, a principal object of the present invention is to increase the error detection and error correction capability of data processing circuits, without significantly increasing the amount of data which must be transmitted over the data transmission link.

SUMMARY OF THE INVENTION

In accordance with the present invention, one or more additional parity correction bits is associated with each word of a digital message, and each parity correction bit represents the sum over at least two vectors through the matrix of data which is being handled.

In accordance with one aspect of the invention, error bits are formed at an error detector circuit by checking parity along the vectors employed at the encoder, including the error correction bits, and lack of parity is indicated by the presence of an error "flag" bit associated with the word where the original parity correction bit was formed. A first single error correcting circuit is provided which corrects single errors within the data and correction bit pattern covered by the vectors; and corrects the information, correction, and error bits associated with all identified single errors; and a second multiple error correction circuit is provided which receives the information, parity correction, and error "flag" bits from the first error correction circuit, and identifies and corrects many and detects very nearly all multiple errors within the vector pattern which were not corrected in the previous single error correcting circuit.

In a preferred form, the vector pattern extends through a single word of the digital information and then diagonally in a V-shaped pattern through adjacent words, preferably skipping alternate information words. Other vector patterns include simple two or more vector patterns, and more complex patterns involving the addition of two or more parity correction bits associated with each word, instead of the preferred single parity correction bit utilizing a three-vector summation.

In accordance with another feature of the invention, the vector encoder and the vector decoder may be substantially identical as they involve the development of parity type sums over substantially the same vectors. This allows the use of a single standardized circuit configuration to implement both the encoder and the decoder.

As mentioned in the Abstract of the Disclosure, the present systems have been referred to as "orchard" systems, by analogy with the visual prospect available both transverse to the edge of an orchard, and at 45 degrees forward and backward from the position of the viewer at the edge of the orchard. Similarly, in the present system a parity correction bit is taken as the sum of at least two vectors extending through a matrix of information including digits corresponding to the fruit trees in the orchard.

Three of the main advantages of "orchard" type error correction are the low ratio of correction bits to information bits, the relatively slow decline in the rate of correctability and detectability as the error rate increases and the possibility of bi-directional, continuous real time error correction.

Incidentally, in selecting a particular circuit arrangement for implementing the error correction system it is preferred that, in order to correct a given number of errors, it is necessary that every bit must be encoded into one more vector through the message than the number of errors to be corrected. An optimum "orchard" error correction and detection pattern will develop a unique pattern of error correction bits for every possible combination of two errors; and the errors are corrected when this unique pattern appears in the error bit shift register or error "rail" associated with the error correction circuitry.

Other objects, features, and advantages of the invention will become apparent from a consideration of the following detailed description and from the accompanying drawings.

BRIEF DESCRIPTION OF THE DRAWINGS

FIG. 1 is a block diagram of a complete system illustrating the principles of the invention;

FIG. 2 is a diagram illustrating one specific error correcting arrangement;

FIG. 3 is a specific illustrative example showing how an error in the transmitted data is identified;

FIG. 5 illustrates a typical parity check circuit;

FIG. 6 is a diagram indicating how the circuit of FIG. 4 may be employed for encoding or for decoding;

FIG. 9 is an initializing circuit;

DETAILED DESCRIPTION

Figure 4:
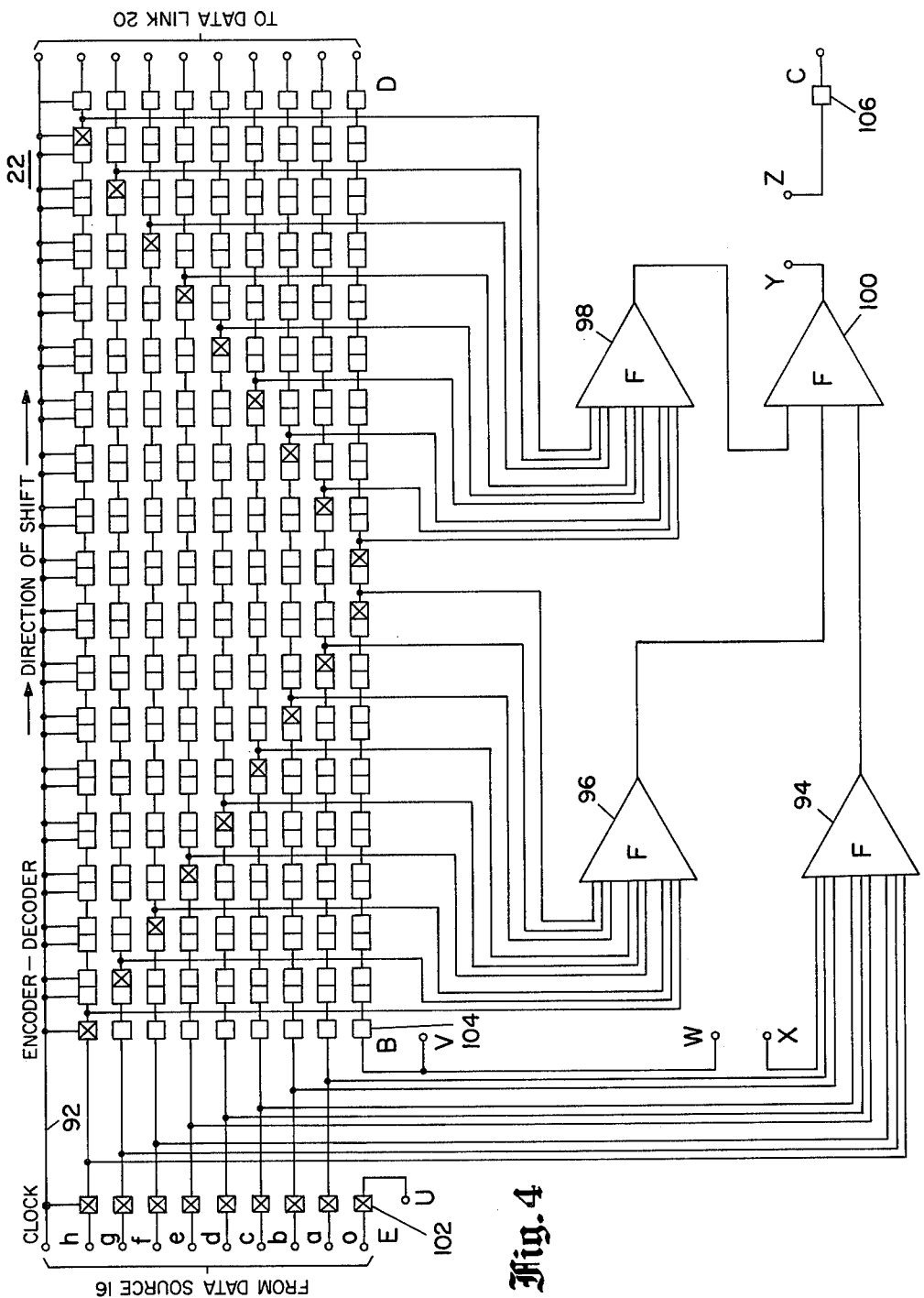
FIG. 4 shows an encoder or decoder circuit for inclusion in the circuit of FIG. 1 in implementing the error correction plan shown in FIGS. 2 and 3.

Referring more particularly to the drawings, FIG. 1 shows a data handling or processing system wherein information has been developed at a source of digital information 16 is eventually used at the data utilization circuit 18, following data processing, including storage and retrieval, or transmission over a "noisy" data transmission link 20. It is understood that the transmission link 20 merely represents a source of errors, and such errors could arise in data processing systems such as a 7 or 9 track tape, floppy disks, paper tape, or hard magnetic storage disks, for example. The data transmission link 20 is shown as a cable, but it might include open wire transmission lines on telegraph poles where electrical storms, sun spots, or other interference might distort and introduce errors into the transmitted digital information. The circuitry of the present invention to be discussed in detail below involves sophisticated and economical error detection and error correction circuitry for correcting errors in the processed or transmitted data so that, in the great majority of cases, the data supplied to the utilization circuit 18 will be precisely that which was initially provided from the source 16.

The encoder circuit of the present invention includes a set of shift registers 22 through which the parallel output data from the source 16 is applied. Typically, the set of shift registers 22 might be capable of storing 30 or 40 parallel "words" of binary information each including four, eight, or sixteen, for example, bits of binary information. Accordingly, the information from the source 16 is delayed by in the order of 30 or 40 digit periods in its transmission from the source 16 to the data transmission link 20. In addition, a parity type correction bit is added to each "word" of digital information, by the parity check bit forming circuit 24 which provides a parity check over three vectors indicated by the dashed lines 26 and the three input leads 28 to the parity check forming circuit 24. The parity correction bit is supplied at lead 30 to the shift registers 22.

At the other end of the cable 20, the parallel information is supplied to the shift registers 32, and a parity circuit 34 examines the data including the parity correction bits formed by the circuit 24, and error bits are supplied on lead 36 to the error bit "rails" or shift registers 38 and 40 which appear at the bottom of the circuit of FIG. 1. When a unique pattern of error bits representing a single error is found along the error rail 38, appropriate signals are applied to leads 42 to energize the gate circuit 44 and implement the correction through the correction or reversing circuit 46 which may actually be located at the output from registers 41. Also, through the circuits 48, the error bit pattern associated with the single error is reversed out of the error bit rail 38. The uncorrected error bit signals are transferred from shift register 38 to shift register 40 over lead 50. Multiple errors having a unique pattern of two error bits in the shift register 40 are recognized by the gate circuit 52 and provide correction in the data in the shift registers 54 through the circuitry 56. The error bits representing a corrected error are removed from the error bit rail 40 by the error bit rail corrector circuits 58. If desired, a third or additional stages of error correction may be provided between the second stage registers 54 associated with the second stage correction circuit and the data utilization circuit 18, however, such additional stages would normally only be needed to insure correction of more than two errors in a multiple vector parity bit pattern.

Referring now to FIGS. 2 and 3, these are diagrams showing the general nature of the parity check scheme (FIG. 2) and one illustrative example indicating the detection of an error. The diagram of FIG. 2 represents the shift registers 22 of FIG. 1. More specifically, digital information in the form of a series of parallel words including the bits A through H . . . N, are supplied at the left-hand end of the shift register as indicated by the arrow 62. This digital information is successively shifted from left to right through the parallel shift registers until it reaches the final stage of the shift register as indicated by the arrow 64 prior to being transmitted through the data transmission link 20 (FIG. 1). The digits which are represented by the letters A through H are summed, and this sum includes sums taken along three vectors 66, 68, and 70 through the data. Then the parity correction or check bit 72 is added to the input of the lowermost shift register included in the array of FIG. 2. These check bits are successively shifted across through the shift register, and are included at locations 74 and 76 as part of the vectors 68 and 70, respectively. As will be discussed below, the correction or check bits 72 may be added to make the sum through the vectors 66, 68, and 70 equal to an odd number or an even number, depending on the parity system which is adopted.

Now, in FIG. 3, it is assumed that there is an erroneous data bit in bit position 78, as shown in the diagram of FIG. 3. Also shown in FIG. 3 are the superposed patterns of error detection groups which will include the erroneous data bit 78. Check bit 80 is associated with the first group of three vectors which will include the erroneous data bits 78; check bit 82 is included in the second group of three vectors which will contain the erroneous data bit 78; and the third check bit, or parity correction bit 84 is included in the third set of vectors which contains the erroneous data bit 78. In the decoder 32, the incorrect parity for these three code groups is detected, and an error bit pattern is supplied to the error bit rail 38 which conforms to the three bits 80, 82, and 84 which appear at the bottom of FIG. 3. There is only one single error which will produce the precise error bit pattern shown by the circles 80, 82 and 84, spaced apart as indicated in FIG. 3. Accordingly, when this pattern is recognized, the erroneous data bit is reversed from a "0" to a "1," or vice versa, and simultaneously the three identifying error bits on the error bit rail 38 are reversed, and thus deleted from the error bit rail, prior to the error bit signals being coupled to the second error bit rail 40.

Figure 7A:
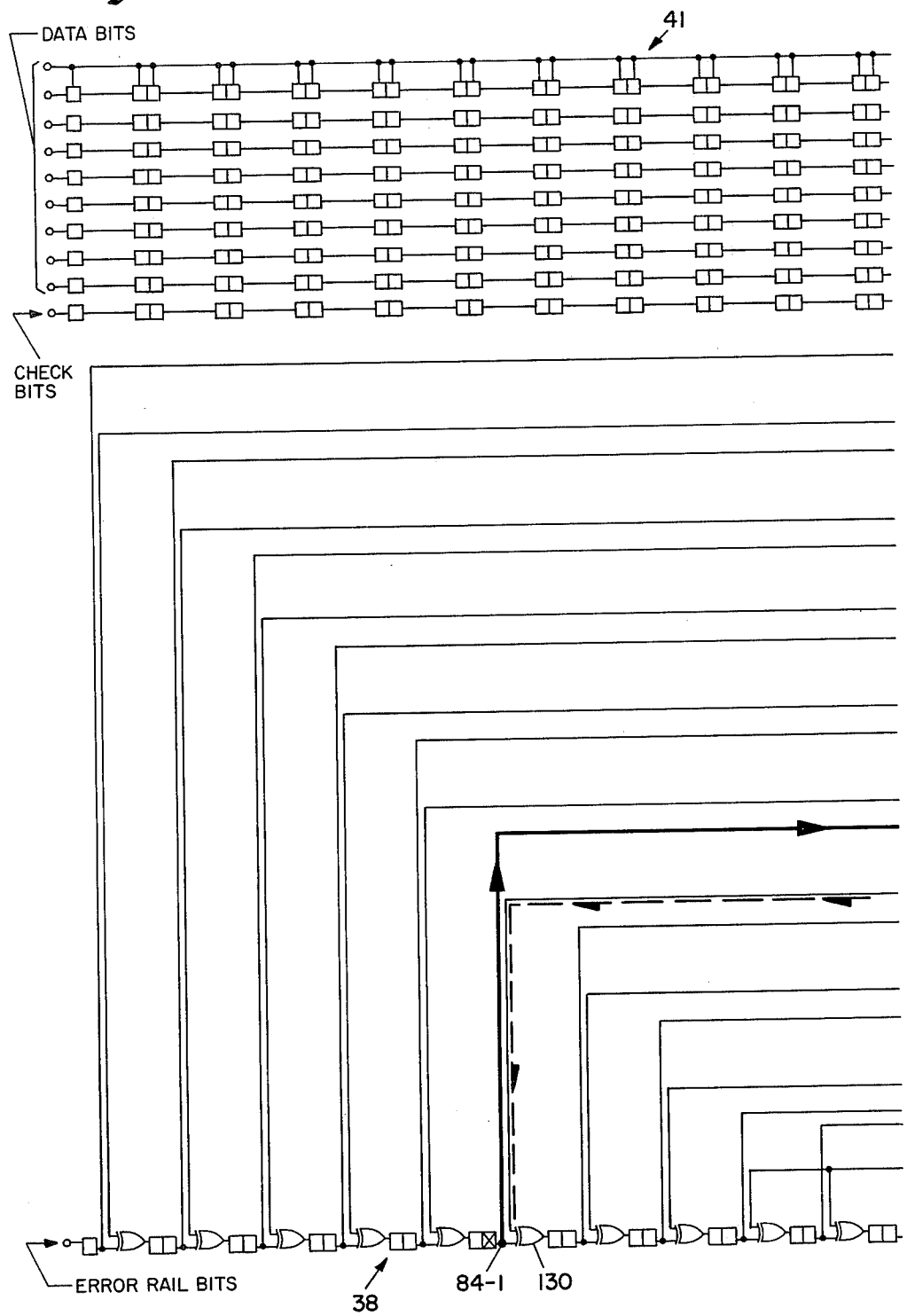
FIGS. 7 and 8, comprised of FIGS. 7a, 7b, 8a and 8b, are the first and second stage correction circuits, respectively, which may be employed in the system of FIG. 1.
Figure 7B:
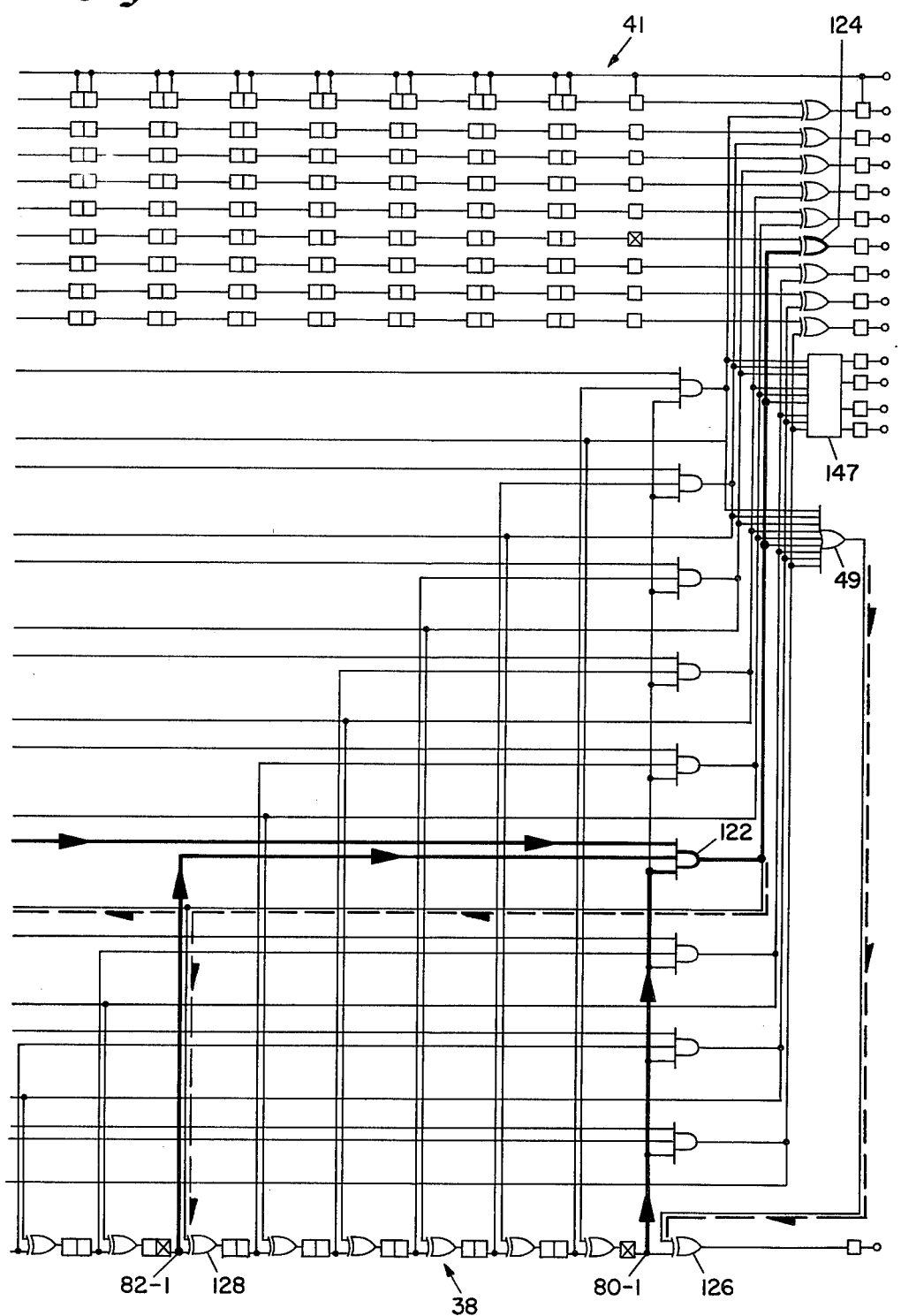

The actual implementation of the correction arrangements of FIG. 3 are shown in greater detail in FIG. 7, but, for completeness, the implementation of the encoder 22 and the decoder 32 of FIG. 1 will now be briefly discussed in connection with FIGS. 4 through 6. FIG. 4 has been prepared in a generalized manner so that it may be employed to implement either the encoder set of shift registers 22, or the decoder set of shift registers 32. As indicated by the letter code of FIG. 6 relating to FIG. 4, when the unit is part of the encoder, the data is inputted from the left from the data source 16, is transmitted from left to right through the shift registers and is coupled from the right-hand end of the shift registers to the data link 20. Each of the individual squares included in FIG. 4 represents a flip-flop, or other stable bit storage element, and all of the data is shifted synchronously from left to right through the shift registers under the control of the clock input signals supplied on lead 92 in accordance with well known principles and practice in the digital data handling field. The three vectors through the data, which were discussed in detail in connection with FIGS. 2 and 3, are implemented in FIG. 4 by the connections to the parity check circuit units 94, 96, and 98, for the first, second, and third vector, respectively, with the outputs from these three parity circuits being combined in the parity circuit 100. For convenience in visually noting the correspondence between FIG. 4 and FIG. 2, for example, the shift register storage circuits from which the output is sensed are marked with "X's." Thus, it may be noted that the vector 66 of FIG. 2 is implemented by the connection from the input registers of the shift register assembly of FIG. 4 which are all connected to the parity circuit 94; the vector 68 is implemented by the connections to the parity circuit 96, and the third vector 70 is implemented by connections to the parity circuit 98. In the case of the encoder, the shift register stage 102 is not included, and the output Y, which represents the parity correction bit, is supplied to the shift register stage 104. On the other hand, the decoder 32, of course, includes the shift register stage 102 coupled directly to the shift register 104, and the outputs from the parity check circuit 100 represent the error bit signals and are coupled down to the input to the error bit rail 38, as shown in FIG. 1. These connections are shown diagrammatically, in letter form in FIG. 6.

Incidentally, concerning FIG. 6, and the designation "Z," the block 106 is the first stage of the shift register referred to as the first of the error bit rails 38. Similarly, the D registers at the right hand side of FIG. 4 may be the first registers of the corrector circuit 41. Alternatively, every output of the circuit of FIG. 4 may be a latched register, in accordance with normal integrated circuit implementation.

FIG. 5 is a typical circuit for forming parity bits, or for forming the sum of input binary digits, modulo 2, and retaining only the least significant digit. Each of the logic circuit representations included in FIG. 5, such as logic circuit 108 are "exclusive-OR" circuits. This means that they are logic circuits which have an output equal to a binary "1" if either but not both of the inputs to the circuit have a state representing a binary "1." The final output exclusive OR circuit 110 has a normal output 112, and an inverted output 114, which is shown connected to the body of the representation of the circuit 110 by a circle 116 indicating inversion of the signal. Accordingly, when a binary "1" appears on lead 112, a binary "0" appears on lead 114, and vice versa. The circuit of FIG. 5 may therefore provide an output signal representing odd or even parity, as the discretion of the logic circuit designer. Parity logic circuits of the type shown in FIG. 5 are sold by most of the major semiconductor supply houses and include all of the circuitry shown in FIG. 5 (and often much more) on a single tiny chip.

Following the development of the error bit signals by the decoder 32 and the parity error bit forming circuit 34, in FIG. 1, the information and correction bits are supplied in parallel from the decoder shift registers 32 to the first stage corrector shift registers 41. Subsequently, following correction, the data bits and check bits are supplied in parallel to the second stage corrector circuit 54. The error bits from circuit 34 in FIG. 1, or from circuit 100 of FIG. 4 are supplied to the error rail shift register 38 which appears along the bottom of FIG. 7.

Assuming that there was an error as shown at 78 in FIG. 3, then a pattern of error bits corresponding to the three bits designated 80, 82, and 84 in FIG. 3 will appear at points 80-1, 82-1, and 84-1, in FIG. 7. These three points are connected, as indicated by the heavy circuit lines, to the AND gate 122 which will in turn correct both the erroneous digit which is at the input to the exclusive OR gate 124 and also will reverse and therefore eliminate the three error indication bits at points 80-1, 82-1, and 84-1, by the application of signals to the three exclusive OR circuits 126, 128, and 130, respectively. In the first stage corrector circuit, all of the AND gate pattern recognizer outputs are ORed together at 49 to drive the exclusive-OR gate at 126.

In passing, it may be noted that an exclusive-OR circuit operates as a correcting circuit as a result of its logical function of providing an output "1" when either but not both of its two inputs are binary "1's." Thus, if the normal input is a "1," when a control signal which is also a "1" is applied to the exclusive-OR circuit, the result is an output "0." Similarly, if the normal input to the exclusive-OR circuit is a "0," the application of a control "1" to the circuit will result in an output "1." The result in each case is that upon the application of a control signal corresponding to a binary "1," the other input signal to the exclusive-OR circuit is reversed.

The other AND circuits which are located above and below the circuit 122 are similarly arranged to have inputs corresponding to other possible single errors of the various digits A through H in the eight-bit words and their associated check bits, so that all single errors within the information span covered by the vectors are corrected, by the time that the data, check bits, and error rail bits are transmitted from the right-hand side of the first stage corrector circuit shown in FIG. 7.

FIG. 8 is the second stage corrector circuit which will correct many double errors within the extent of the vectors being employed. For the purposes of considering FIG. 8, it will be assumed that an additional bit 132 (see FIG. 3) has also been reversed in the course of transmission through the data link 20. This will have the effect of reversing the error rail bit which would otherwise have appeared at point 84-1 of FIG. 7, corresponding to the parity check over the vector from which the check bit 84 was originally formed. With only two bits appearing in the error rail circuit, at points 80-1 and 82-1 of FIG. 7, the AND gate 122 will not be energized, and no correction will be accomplished in the first stage corrector circuit of FIG. 7.

The erroneous information will therefore be transmitted on from the shift registers 41 of FIG. 7 to the shift registers 54 associated with the second stage corrector. Similarly, the error bits will be transmitted unchanged along the error bit rail 40 until they reach the points 80-2 and 82-2 as shown in FIG. 8. The signals from these two points provide inputs to the AND circuit 134 and will provide an error correction signal which will pass through the OR gate 136 and be applied to the exclusive-OR circuit 138 to reverse the erroneous bit 78 (see FIG. 3) which is the fourth bit in the word at the output of the shift register 54, or the third information bit in the bit position "C" of the word. Incidentally, the erroneous bit 132 (see FIG. 3) will be corrected at a later point in time, when this bit 132 reaches the output of the second stage corrector of FIG. 8.

The other AND and OR circuits which are above and below the circuits 134 and 136 in FIG. 8 operate in a similar manner to correct many of the double errors which reach this second stage corrector circuit. As in the case of the circuit of FIG. 7, the error rail bits which are employed in making a correction, will also be reversed. To insure that we do not change a correct bit at point 80-2 (which could arise from two or other even numbers of errors), the error rail bit at 80-2 should only be corrected when an odd number of error corrections occur during a clock period. This is accomplished by exclusive-ORing the AND gate pattern recognizer outputs at 59 and then driving the exclusive-OR gate at 80-2. A typical integrated circuit to accomplish the exclusive-ORing at 59 would be the 74280. If more than two corrector stages are used (i.e. a system where more than three vectors are encoded in the "orchard" pattern) the first corrector stage will OR the outputs of the AND gate pattern recognizer. Every subsequent corrector stage should exclusive-OR the AND gate pattern recognizer outputs so that the leading bit in the error bit rail is only corrected when an odd number of error corrections occur during one clock period.

Some combinations of three or more errors within a vector pattern may produce cancellations in the error bit rail which make correction impossible. In these cases the error bits will not be corrected out of the error bit rail 40 and will be available to the data utilization system at 142, as an indication of an uncorrectable error. Schematically shown in FIG. 1, therefore, is the incorrectable error detection circuit 146. A corrected error monitoring circuit 147, (see FIGS. 1 and 8) is also provided.

FIG. 9 shows an "orchard" encoder/decoder array initializer circuit. The leads 152 may represent the data input from the host system and the leads 154, the output to the orchard encoder or decoder. The circuits designated 156 are tri-state bus drivers which are employed to fill the register array with specific digital word, such as all zeros, with positive logic, as a block separator. For example, after the last word of a message as passed into the orchard system, the flip-flop 158 would be energized to supply an appropriate signal on the enable line 160 so that all zeros are included in the start and ending of a message so that the vectors extending beyond the beginning and after the end of the message do not include extraneous information.

Figure 10:
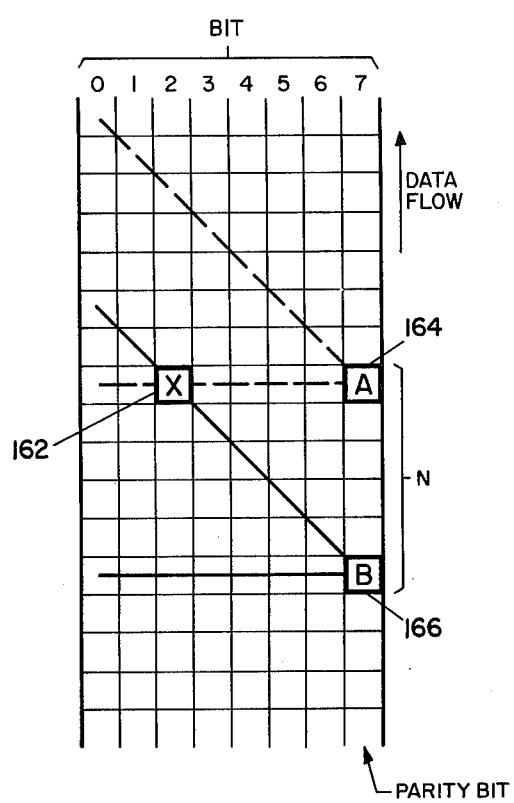
FIGS. 10 through 14 are diagrams illustrating alternative "orchard" correction vector arrangements.

FIGS. 10, 11, 12, 13, and 14 include alternative "orchard" vector encoding schemes. In FIG. 10, a simple "bent-row" error correction system is employed, so that an erroneous digit X at point 162 appears in the two parity check locations 164 and 166 which have a unique spacing depending on the particular bit which is in error. With the two parity bit discrepancies (which would be applied to the error bit rail) precisely five bits apart, this uniquely identifies bit number 2 as being the erroneous one. With only two vectors, double errors falling along either of the vectors will result in an erroneous correction and no detection of an uncorrectable error.

Figure 11:
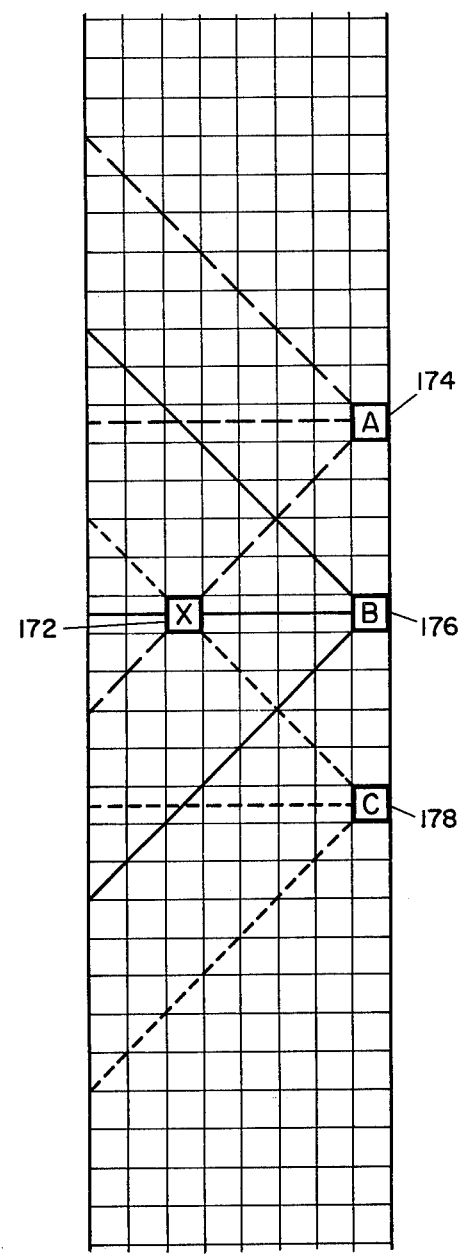

FIG. 11 shows a pattern which resembles the classic view through an orchard by an observer on one side of the field, and specifically includes one vector extending directly across the array of digital information and additional vectors angled forward and backward. In the system of FIG. 11, the erroneous bit 172 is uniquely identified by discrepancies in the error bit positions 174, 176 and 178.

Figure 12:
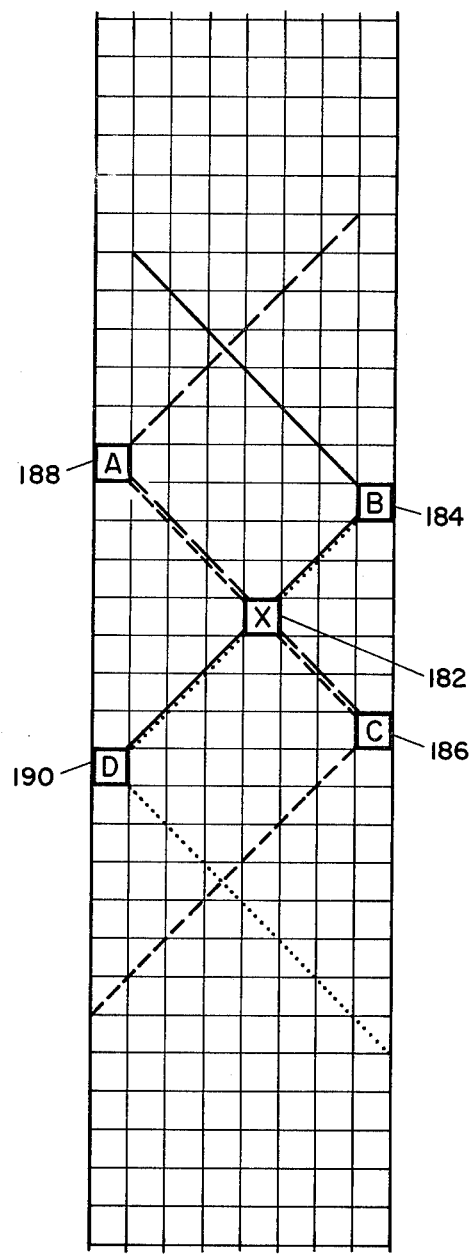

In the system of FIG. 12, the error point 182 is uniquely identified by the four error bits 184, 186, 188 and 190. In the arrangement of FIG. 12 two parity correction bits are associated with each input word, and two error rail bit shift registers would be provided. The organization of FIG. 12 will have greater error correcting capability, but at the cost of increased redundancy, as compared with some of the other systems.

Figure 13:
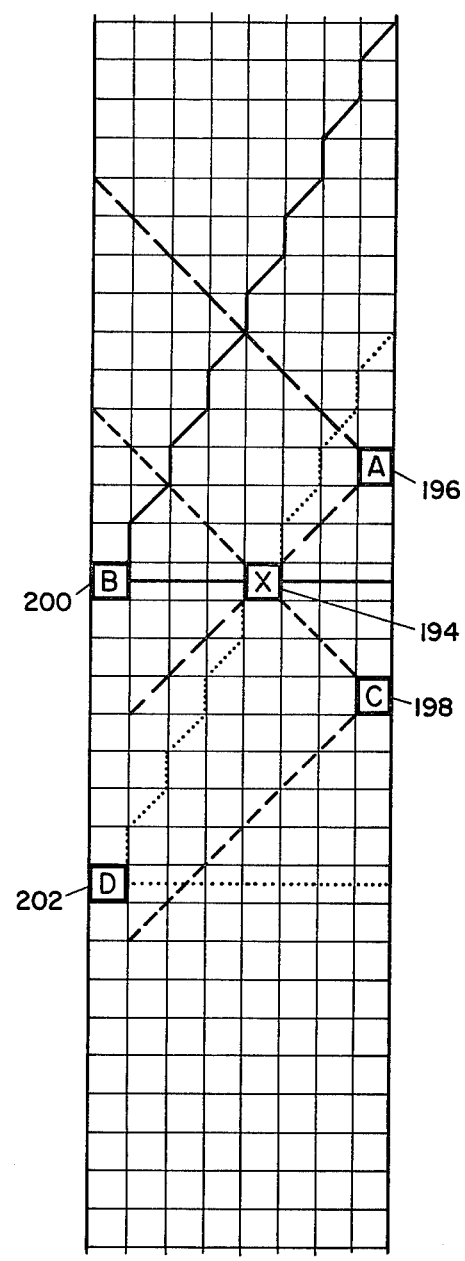

The vector arrangement of FIG. 13 indicates another alternative using two parity correction bits associated with each digital word. The erroneous digit 194 is shown identified by the discrepancies indicated at error rail bits 196, 198, 200, and 202. The vectors employed at the right-hand side as shown in FIG. 13 are simple forwardly and rearwardly directed diagonals, while the vectors employed in forming the bits which appear at the left-hand side of FIG. 13 include a direct transverse vector, and a skip bent row diagonal vector.

Figure 14:
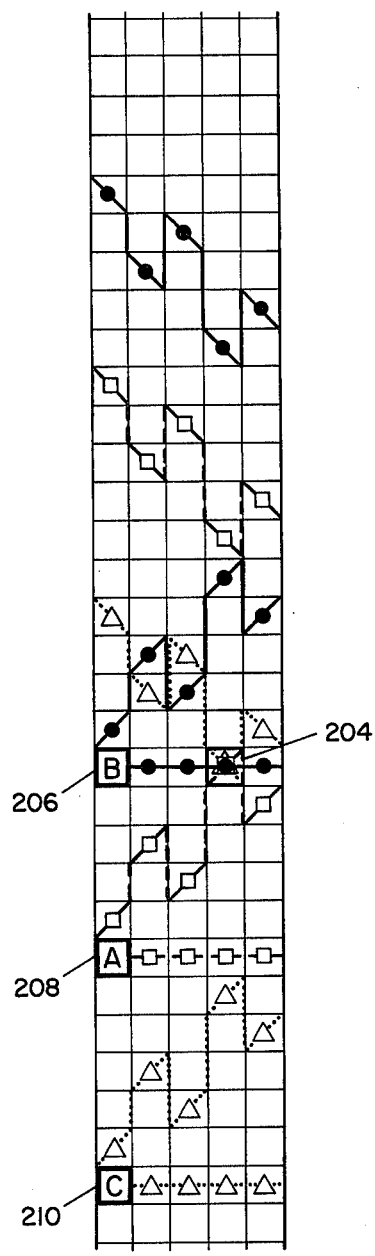

The pattern in FIG. 14 has vectors which are not arranged in a straight line, showing that this is not a necessary requirement for an "orchard" encoding pattern. The bit in error, 204, is uniquely located by the convergence of the three sets of vectors associated with the parity check locations at 206, 208, and 210. This pattern has a short parallel word distance which improves the correctable error rate. Incidentally, the pattern of FIG. 14 includes four data bits and one check or "orchard" bit in each word.

Incidentally, in the cases of the various vector arrangements shown in FIGS. 11 through 14, the vectors which are summed to produce a given error correction bit have been marked with an identifying characteristic, such as a cross line or a circle.

Figure 15:
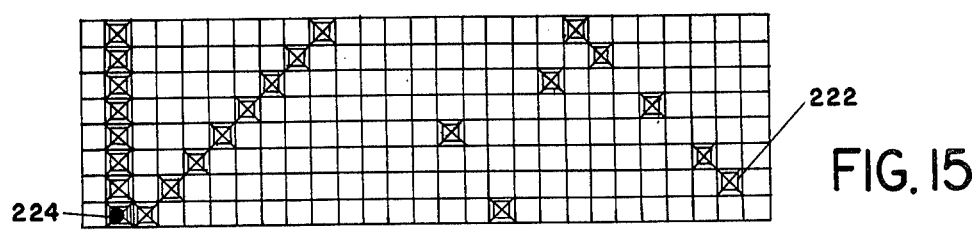
FIG. 15 illustrates an economical error correction vector for words including seven information bits and one parity bit.

Consideration will now be given to the vector pattern of FIGS. 15 and 16, with FIG. 15 relating to an 8 bit word, and FIG. 16 relating to a 5 bit word. The patterns in each of these two groups have been selected so that the overall distance from the most remote bit such as bit 222 in FIG. 15 to the newly formed parity check bit 224 is as short as possible consistent with maintaining a unique distance between the error flag bits which will represent single errors. Similar consideration involving minimizing the distance between the most remote bit 226 and the parity check bit 228, when into the formation of the vector arrangement of FIG. 16.

Figure 17D:
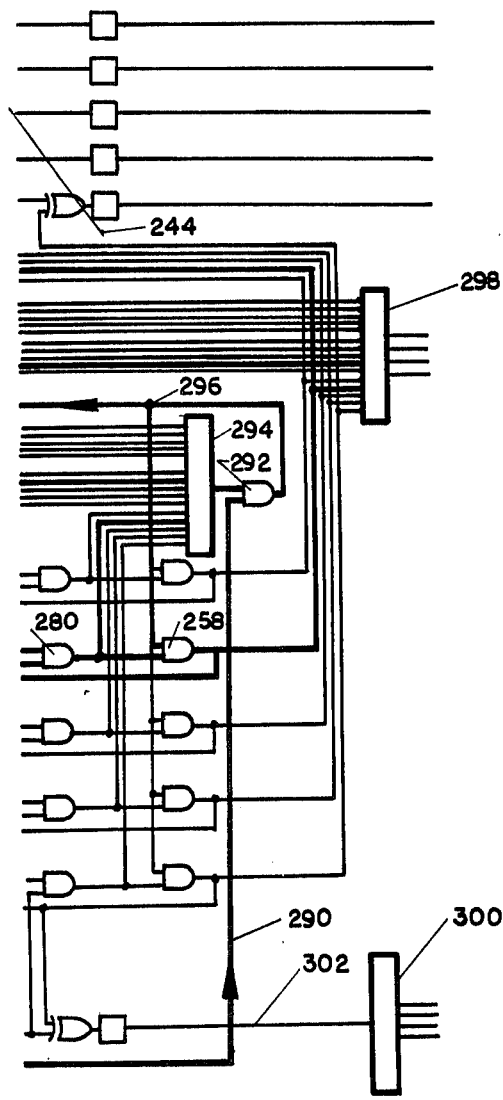
FIG. 17, comprised of FIGS. 17A–17D, is a preferred double error correcting circuit for vector patterns as shown in FIG. 16.
Figure 16:
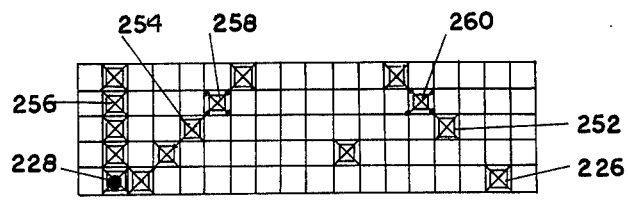
FIG. 16 is an economical vector arrangement for four information bits and one parity bit in each word.
Figure 17B:
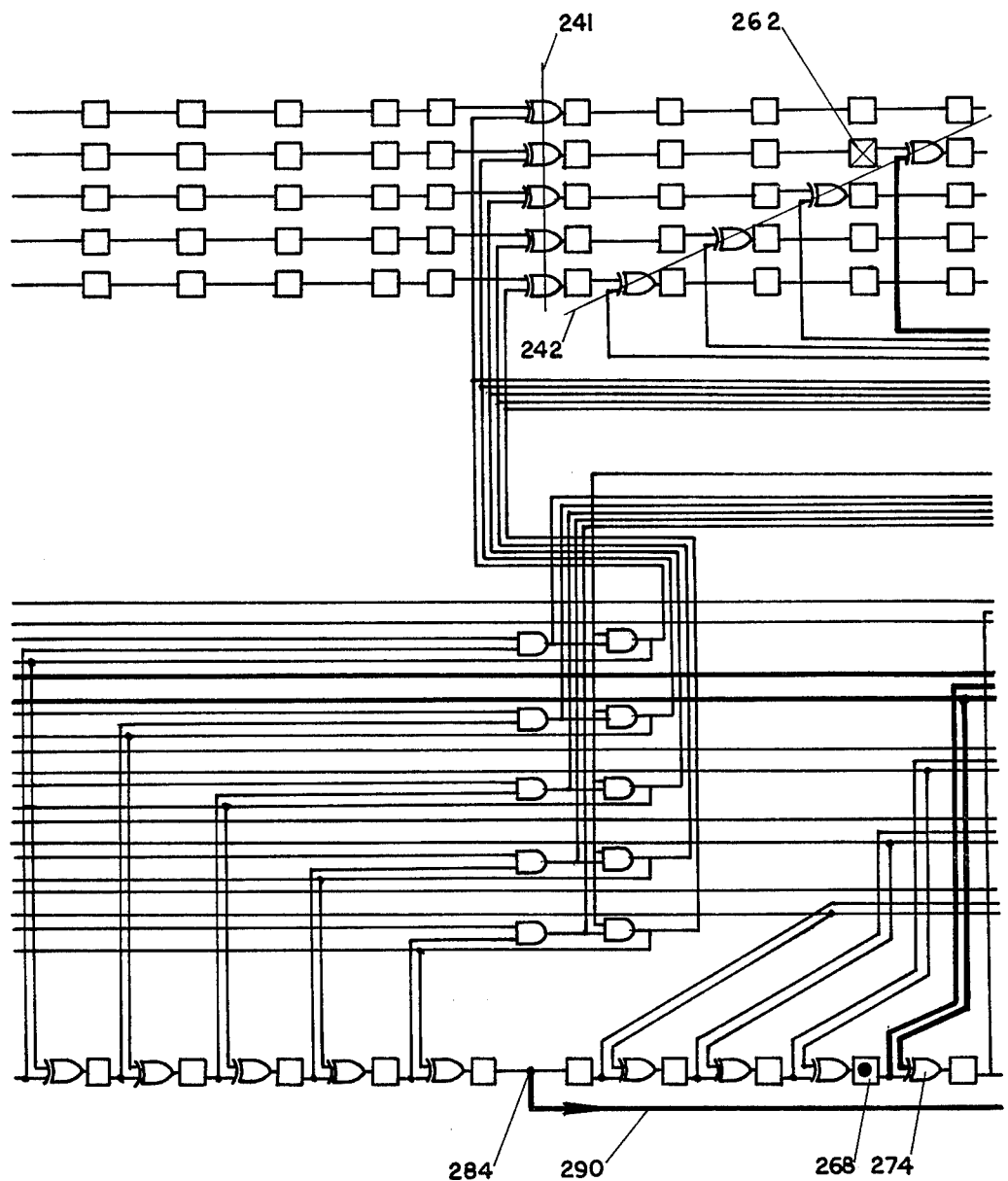
Figure 17C:
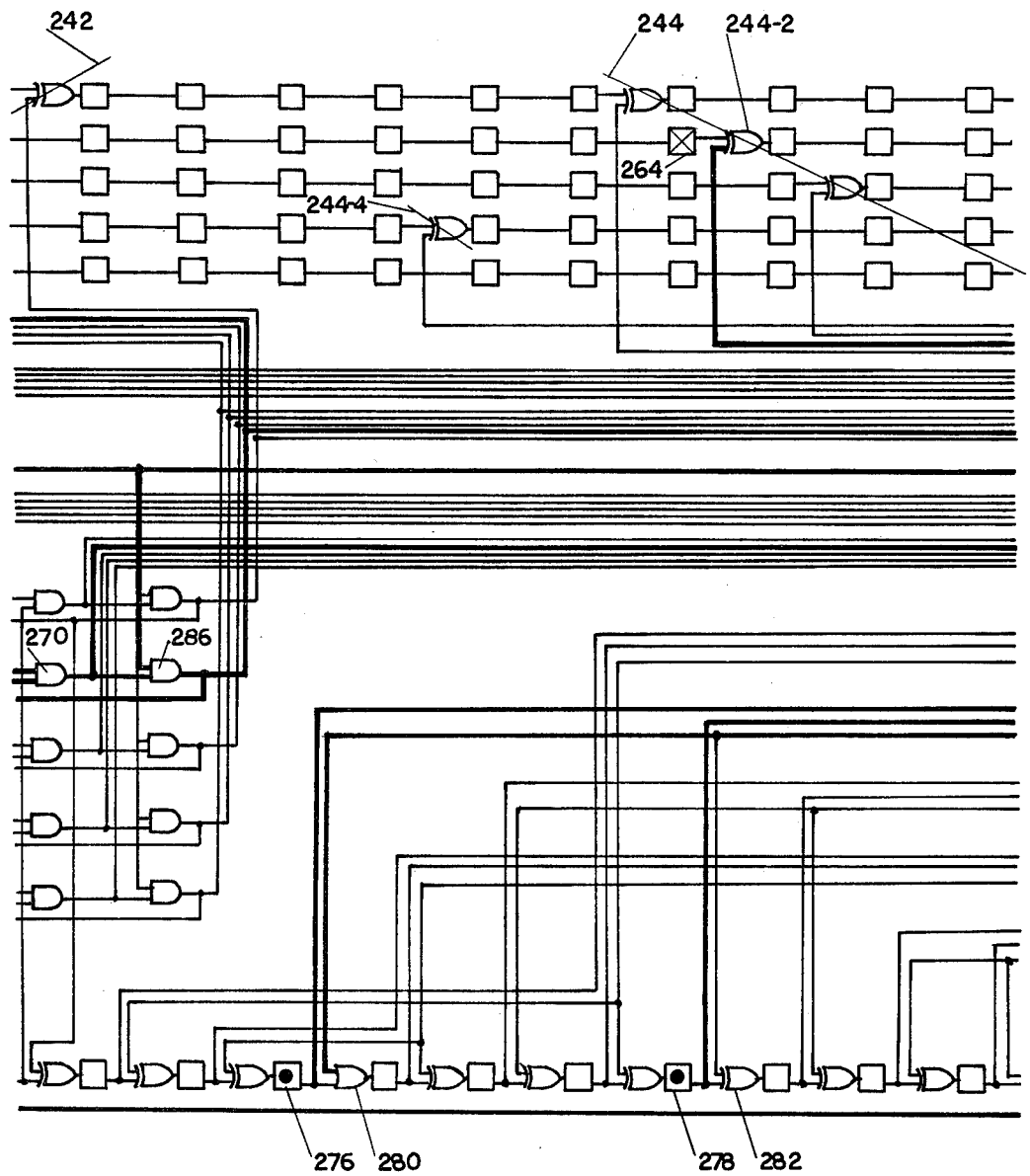

FIG. 17 is a second stage error correction circuit for the vector pattern shown in FIG. 16. FIG. 17 corresponds to block 54 and the associated error rail and logic circuitry located below block 54 in FIG. 1, and which together form the second stage corrector circuit.

Now, considering the inputs to the circuit of FIG. 17, the parallel input appears at six registers or bit positions 231 through 236. Bit positions 231 through 234 include the original information bits, and bit position 235 contains the parity check bits formed as indicated in FIG. 16. With reference back to FIG. 1, the original information bits in each 4 bit word originate from the source of digital information 16, and parity check bits are formed and supplied on lead 30 in FIG. 1 at the remote encoding location. Following transmission over an extended data transmission link, or other noisy and error prone circuits, the parity check bits are rechecked to determine if there have been any errors in transmission, and any errors which have been introduced are noted by bits which are inserted into the error bit rail. Accordingly, the presence of an error bit at the exclusive-OR circuit 236, for example, means that one or an odd number of the bits included in the complete pattern of FIG. 16 has been changed or reversed.

Figure 8A:
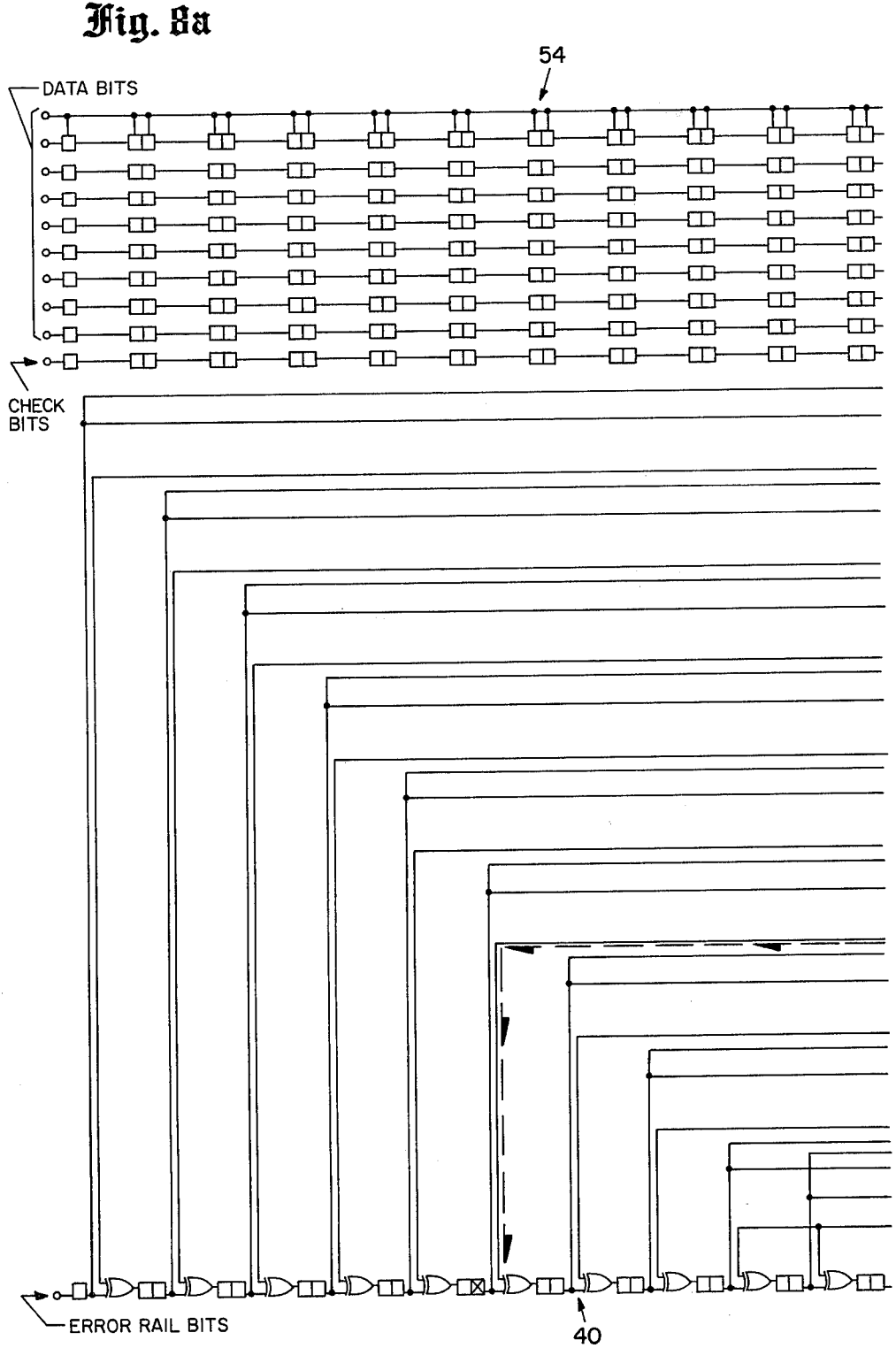
Figure 8B:
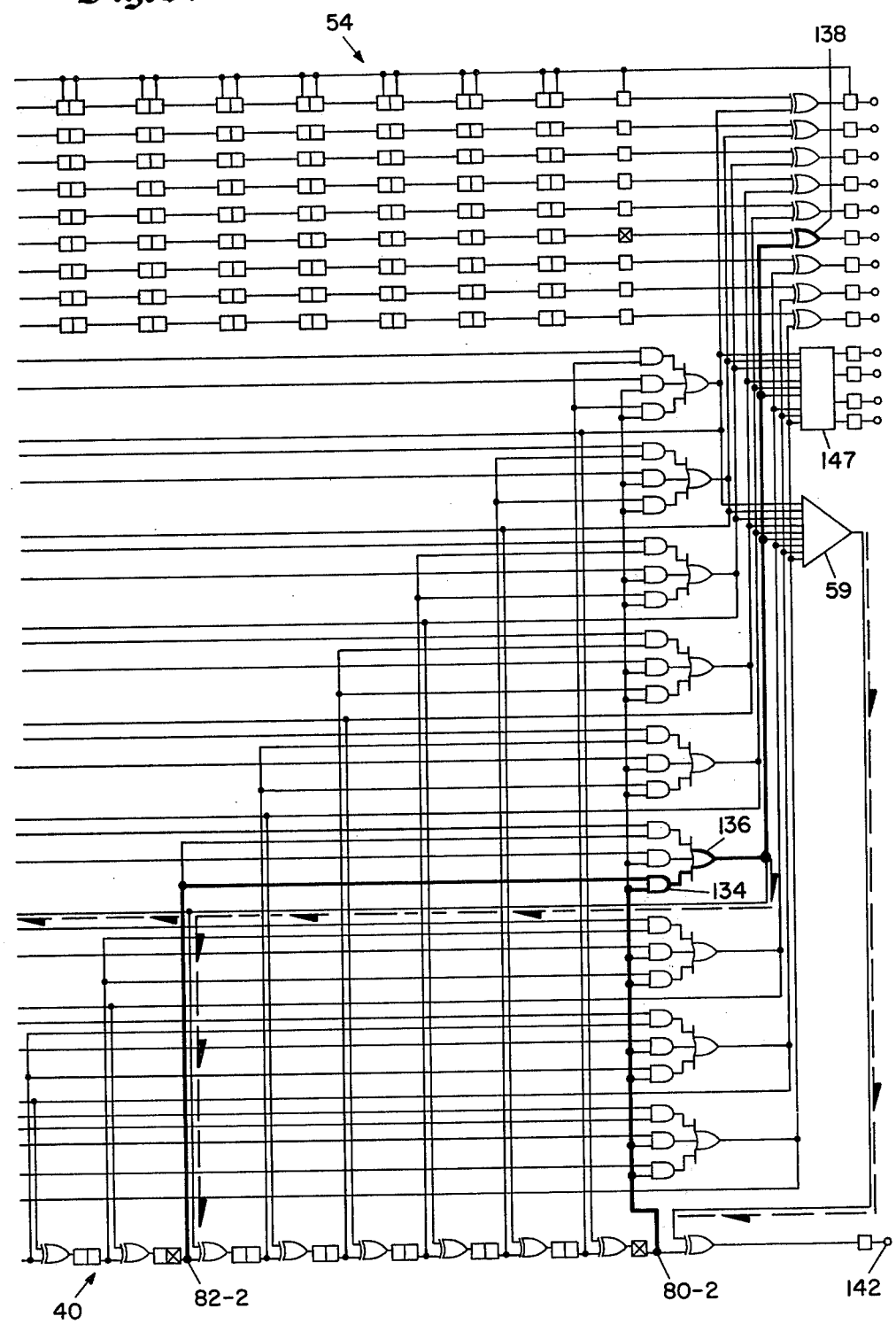

Now, in the analysis of the circuit of FIGS. 8A and 8B, it was shown how certain specific double errors were corrected by that circuit. However, subsequent analysis has indicated that not all double errors were actually corrected by the circuit of FIGS. 8A and 8B. The circuit of FIG. 17, however, does indeed correct all double errors which may be included within the correction grouping covered by the vectors as set forth in FIG. 16. It is noted that the double errors were corrected in circuit FIGS. 8A and 8B at a series of exclusive-OR circuits which appear in the upper right-hand portion of FIG. 8B aligned with the exclusive-OR circuit 138. On the other hand, in FIG. 17, the double errors are corrected by a series of exclusive-OR circuits including the first group 241 which extend directly across and correspond to one vector through the registers which hold the bit pattern. A second group of exclusive-OR circuits 242 also accomplish correction of errors included among the double errors, and the final set of exclusive-OR correction circuits 244 which are included in the third vector extending through the matrix of bits in the register at the top of FIG. 17. It may be noted that the error correction arrangement of the exclusive-OR circuits 241, 242, and 244, corresponds substantially to the encoding vector pattern as set forth in FIG. 16, in contrast to the single set of exclusive-OR correction circuits which are employed in FIG. 8B. It is believed that this new arrangement whereby a set of double errors are corrected concurrently or substantially simultaneously, is at least in part responsible for the improved error correcting capability of the circuit of FIG. 17 as compared with that of FIGS. 8A and 8B.

Proceeding to a more detailed consideration of the circuit of FIG. 17 and the plot of FIG. 16, a single error is normally identified in the course of recalculation of 3 parity check bits. For example, with reference to FIG. 16, let us assume that one of the data bits which is in position 252 is in error. When a parity check is made over all of the bits shown in FIG. 16, including the original parity check bit 228, it will found that an error is present, and this would normally result in an error bit being supplied to the error bit rail which extends along the bottom of the single error correction circuit of FIG. 7. Also, when the data bit was included in position 254 and in position 256, as the data shifts through the registers, additional flag bits would have been included in the error bit rail. In the event that only single errors are present, therefore, there will be three "flag" bits in the error bit rail, and the error will properly have been corrected in the single error corrector corresponding to FIGS. 7A and 7B, but having a correction pattern as shown in FIG. 16.

However, if there are two errors present within a predetermined distance, one of the three flag bits associated with each error may be cancelled out, and we will now consider an example of such a case. For example, let us assume that there have been errors introduced into bit positions 258 and 260 in FIG. 16. This would correspond to errors in registers 262 and 264 approaching the exclusive-OR gates 241-4 and 244-2 in FIG. 17. With errors appearing in both digit positions 258 and 260 in FIG. 16, the parity check bit 228 will appear to be correct, and no error flag bit will be present on the error bit rail corresponding to the parity check position where the two errors cancel one another out. However, there will be two error flag bits remaining for each of the two erroneous bits 258 and 260, and accordingly there will be four error flag bits in the error bit rail. As it turns out, the two error flag bits which identify the error in register 262 appear in the error bit rail at register locations 266 and 268. The output signals from these two registers energize the AND gate 270 which supplies signals to correct the error from register 262 in the exclusive-OR circuit 241-4 and to correct the error flag bits at exclusive-OR circuits 272 and 274. Similarly, the two remaining error bits identifying the error in register 264 appear in the error bit rail in registers 276 and 278, which are combined in the AND gate 280 which initiates signals which are subsequently applied to the exclusive-OR circuits 244-2, 280 and 282, correcting not only the erroneous bit in register 264, but also the flag bits.

The point 284 in the error bit rail is important and is the shared bit position where an error flag bit would have been present for both of the two errors if they had not occurred simultaneously. However, for double error correction, there must be a "zero" at this point in the error bit rail, and this is employed to enable the AND gate 286 and the AND gate 288, which are required prior to the implementation of the double error corrections steps mentioned hereinabove. The signal on lead 290 from the shared bit position 284 is applied to the inhibiting circuit 292 at the output of the even parity circuit 294. Accordingly, the control signal which enables correction, and which appears on line 296 is present only if an even number of corrections are being undertaken, and if there is no signal at the shared bit position 284.

The counter circuit 298 provides the system with a count of the number of double errors which have been corrected. The counter circuit 300 may be provided to maintain a count of the number of "unreversed or uncorrected) error flag bits at the output 302 from the error bit rail. All single errors would have been corrected previously and all double errors are corrected in circuit of FIG. 17. Accordingly, if a significant count appears in circuit 300, it would appear that the data transmission channel is becoming so noisy that the error capability of the circuit is being exceeded, and system redesign or maintenance may be necessary.

It is to be understood, of course, that the single error correction circuit of FIG. 7 would be modified to handle the pattern of FIG. 16, to be compatible with the circuit of FIG. 17. In addition, the single and multiple error correction circuits may be combined, using a single error rail but somewhat more complex logic circuitry, as required to correct all single and double errors within the space of two parity group patterns.

Now that the detailed description has been completed, it is useful to summarize some of the features which go into the formation of a preferred "orchard" error correction pattern. These factors will be listed below.

1. The distance between all possible combinations of two error flag bits, bits which would be applied to the error bit rail, within a given pattern, is unique. Viewed from a different standpoint, this may be stated in other terms, as follows: The parallel word distance between every possible combination of two data bits from the same bit position in separate words must be unique with respect to the parallel word distance between every other possible combination of two data bits from the same bit position in separate words, within a given Orchard pattern.

2. In order to insure correction of every possible combination of two errors, an optimum orchard pattern should flag a unique error bit pattern into the error rail for every possible combination of two errors.

3. Since the distance between any two error flag bits within a given pattern is unique, the error flag bits for one error can cancel only one of the error flag bits for another error (i.e. there is no possibility of more than one error flag bit cancellation arising from a first error being cancelled by any other single error).

4. Any one error out of N errors can only have one error flag bit cancelled by any one of the error flag bits of each of the other n−1 flag patterns. In order to have two error flag bits remain for that one error each bit must be encoded into (N−1) plus two vectors extending through the data and the correction bits for N errors within a distance of n words, so that two error flag bits per bit in error will remain after N−1 cancellations occur. In other words, each bit must be encoded into N+1 error flag bits in order to have fail-safe correction of N errors within a distance of n words.

5. Fail-safe error detection requires that a minimum of one error flag bit remain uncancelled for each bit in error. In order to have one error flag bit remain for that one error (i.e., error detection sufficiency) each bit must be encoded into (N−1) +1 vectors through the data and correction bits for N errors within a distance of n words, so that one error flag bit per bit in error will remain after N−1 cancellations occur. In other words, each bit must be encoded into N orchard bits in order to have fail-safe detection of N errors within a distance of n words.

In conclusion, the present invention has been described in terms of one specific embodiment, and several other possible organizations. It is to be understood that various other modifications in the present system are quite practical, including the use of multiple "vectors" which while including all of the digits in a binary word, need not regularly step across the successive words in an encoded body of information, but may skip back and forth among these words, as long as the decoder and correcting circuitry is consistent therewith. Also, of course, other logical implementations of the parity check, correction, and other functions described herein, may be employed, and it is particularly to be noted that some overlap of the shift registers of the decoder 32 and the first stage connector circuit 41 may be accomplished. Accordingly, the present invention is not limited to that precisely as shown and described herein.

What is claimed is:

1. A system for the transmission or processing of digital information with the correction of errors comprising:
   a source of digital information;
   a digital data handling system subject to the introduction of errors into the transmitted data;
   means for arranging the information from said source of digital information in a series of parallel words;
   means for forming one or more parity correction bits, associated with each word, with each correction bit being chosen to make the entire sum of the bits along at least two different vectors through the digital information, either odd or even, with every data bit being included in at least two such vectors;
   means for transmitting the digital information including the correction bits over the data handling system, wherein occasional bits are reversed, thereby introducing errors into the digital information;
   means for subsequently forming the sum along said vectors through the information and said parity correction bits and for forming an error flag bit pattern identifying vector sums including parity correction bits which do not conform to the established parity;
   first error correction circuit means for correcting single errors within the digital information and correction bit pattern covered by said vectors, in accordance with said error flag bit pattern;
   second error correction circuit means for correcting multiple errors within the digital information and correction bit pattern covered by said vectors in accordance with error flag bit patterns representing such multiple errors; and
   a data utilization circuit connected to receive and utilize the corrected digital information.

2. A system as defined in claim 1 wherein said first error correction circuit further includes means for correcting the error flag bits involved in the identification of said single errors.

3. A system as defined in claim 1 wherein said system includes means for adding only a single parity correction bit to each digital word information and wherein each said correction bit involves a sum over three vectors through said data.

4. A system as defined in claim 1 wherein said system includes means for forming each said correction bit as a sum over three vectors through said digital information.

5. A system as defined in claim 4 wherein one of said vectors includes one complete word of said digital information, and wherein said each of the other two vectors extends through said data along different patterns to include a one bit from each bit position of the digital words, with each bit being drawn from different word.

6. A system as defined in claim 1 wherein said means for forming parity correction bits includes means for summing bits along at least one vector which includes bits from alternate words.

7. A system for the transmission or processing of digital information with the correction of errors comprising:
   a source of digital information;
   a digital data handling system subject to the introduction of errors into the transmitted data;
   means for arranging the information from said source of digital information in a series of parallel words;
   means for forming one or more parity correction bits, associated with each word, with each correction bit being chosen to make the entire sum of the bits along at least three unique vectors through the digital information, either odd or even, with every data bit being included in at least three such vectors;

means for routing the digital information including the correction bits through said data handling system, wherein occasional bits are reversed, thereby introducing errors into the digital information;

means for subsequently forming the sum along said vectors through the information and said parity correction bits and for forming an error flag bit pattern identifying vector sums including correction bits which do not conform to the established parity; and means responsive to said error bit pattern for correcting the errors.

8. A system as defined in claim 7 wherein said correcting means includes a first single error correcting circuit and at least one multiple error correcting circuit.

9. A system as defined in claim 8 wherein said first single error correction circuit includes means for correcting the error flag bits associated with single errors, and wherein said second multiple error correcting circuit operates in response to the corrected error flag bit pattern received from said first error correcting circuit.

10. A system as defined in claim 7 including means for forming said parity correction bits with a different distance between every possible combination of two data bits in the same bit position and in the same error correction vector.

11. A system as defined in claim 10 wherein each data bit is included in only two vectors.

12. A digital data processing system including error correction comprising:

means for supplying digital data in the form of successive words of binary information;

means for forming at least one parity correction bit associated with each word, said parity correction bit constituting a sum over at least two vectors extending through said digital information;

means for subsequently forming successive error flag bits associated with each word, and constituting sums over the same vectors employed in forming the original error correction bits;

a first error correction circuit for sensing error flag bit patterns corresponding to single errors within the encoded data and for correcting these single errors along with the error flag bits by which they were identified; and second error correction circuitry for receiving digital information and uncorrected error bits from said first correction circuit and for correcting digits included in multiple errors through the unique error flag bit pattern identifying such errors.

13. A system for the transmission of processing of digital information with the correction of errors, as defined in claim 1 or 12 wherein said system includes means for correcting said multiple errors simultaneously.

14. A system for the transmission or processing of digital information with the correction of errors, as defined in claim 1 or 12 wherein said second error correction circuit includes a pattern of correction circuits arranged to substantially conform to the configuration of said vectors extending through said digital information.

* * * * *